(No Model.) 5 Sheets—Sheet 1.

J. FRYDMANE.
APPARATUS FOR COPYING, REGISTERING, CHECKING, AND ADDING.

No. 604,977. Patented May 31, 1898.

WITNESSES.
Julius Lutz
John Lotka

INVENTOR:
J. Frydmane
BY
ATTORNEYS.

(No Model.) 5 Sheets—Sheet 2.

J. FRYDMANE.
APPARATUS FOR COPYING, REGISTERING, CHECKING, AND ADDING.

No. 604,977. Patented May 31, 1898.

WITNESSES.

INVENTOR:
J. Frydmane
BY
ATTORNEYS.

(No Model.) 5 Sheets—Sheet 3.

J. FRYDMANE.
APPARATUS FOR COPYING, REGISTERING, CHECKING, AND ADDING.

No. 604,977. Patented May 31, 1898.

WITNESSES.
Julius Lutz
John Lotka

INVENTOR:
J. Frydmane
BY
[signature]
ATTORNEYS.

J. FRYDMANE.
APPARATUS FOR COPYING, REGISTERING, CHECKING, AND ADDING.

No. 604,977. Patented May 31, 1898.

(No Model.) 5 Sheets—Sheet 5.

J. FRYDMANE.
APPARATUS FOR COPYING, REGISTERING, CHECKING, AND ADDING.

No. 604,977. Patented May 31, 1898.

WITNESSES:

INVENTOR
J. Frydmane
BY
ATTORNEYS.

UNITED STATES PATENT OFFICE.

JULES FRYDMANE, OF PARIS, FRANCE.

APPARATUS FOR COPYING, REGISTERING, CHECKING, AND ADDING.

SPECIFICATION forming part of Letters Patent No. 604,977, dated May 31, 1898.

Application filed February 4, 1897. Serial No. 621,980. (No model.)

*To all whom it may concern:*

Be it known that I, JULES FRYDMANE, negociant, a citizen of the Republic of France, residing in Paris, France, have invented an Automatic Apparatus for Copying, Registering, Checking, and Adding, of which the following is a specification.

This invention relates to an apparatus for transferring, registering, checking, and at the same time adding automatically figures—for instance, in bookkeeping.

The apparatus comprises a device for progressively adding the figures as they are registered.

The apparatus is employed in conjunction with and operated by a board adapted to be inserted in the machine. This board carries a pad on which figures may be inscribed and a series of pivoted projections or plates bearing numerals and other indications, and these plates when in a predetermined position are adapted to engage certain parts of the machine upon the insertion of the board, and thus the machine will be operated according to the position of the said plates.

The invention will be fully described hereinafter and the features of novelty pointed out in the claims.

Reference is to be had to the accompanying drawings, forming a part of this specification, in which similar characters of reference indicate corresponding parts in all the figures.

Figure 15:
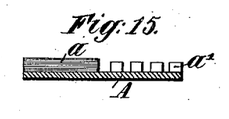
Figs. 15 and 16 are respectively an end view and a plan of the registering and operating board employed in conjunction with my apparatus.
Figure 16:
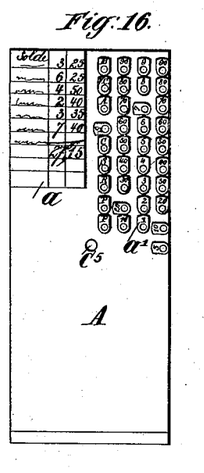
Figure 17:
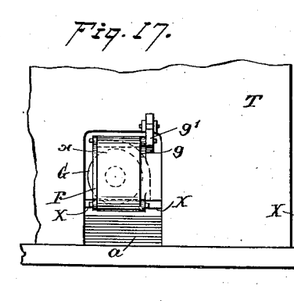
Figs. 17, 18, and 19 are details of the numbering and dating mechanism.

The board A, Figs. 15 and 16, is provided with a pad $a$ and with a series of pivoted plates $a'$, placed in rows, as shown. The ten plates of the first row are marked "5," "10," "20," to "90," indicating, for instance, cents. The second row has nine plates marked "1," "2," "3," to "9," indicating units, (dollars.) The third row, marked "10," "20," "30," to "90," indicates tens of dollars, and the fourth row bears letters or signs standing for commercial terms, such as "Balance," "Debit," "Credit," "Exchange," and the like. Of course I could add rows for hundreds, thousands, and so on. The plates $a'$, being pivoted, can assume a position at a right angle to their normal position. This enables the operator to register by means of the plates any sum whose items may be entered upon one of the leaves of the pad $a$. Thus in the example shown the total foots up to twenty-seven dollars and fifteen cents, and accordingly there are turned on their pivots to extend horizontally first the plates marked "10" and "5" in the cents' row, then the plate marked "7" in the dollar row, and the plate marked "20" in the row of tens. There is also turned sidewise one of the plates in the last row—for instance, a plate bearing the indication "S," which may stand for "Sold." It will be seen that the plates $a'$ when turned sidewise project into the spaces between the rows of plates, and in this position they are adapted to actuate the apparatus in the manner fully described hereinafter.

Figure 1:
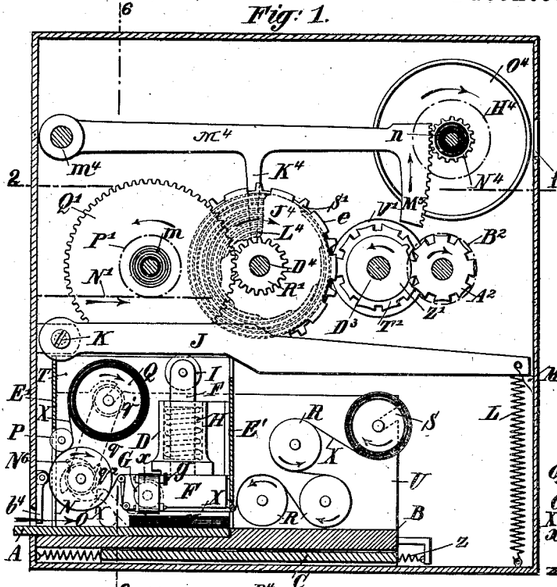
Figure 1 is a longitudinal sectional elevation of the apparatus on the line 1 1 of Fig. 2.
Figure 6:
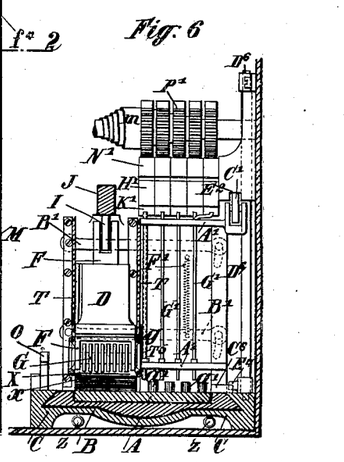
Fig. 6 is a broken partial transverse section on the line 6 6 of Fig. 1.
Figure 7:
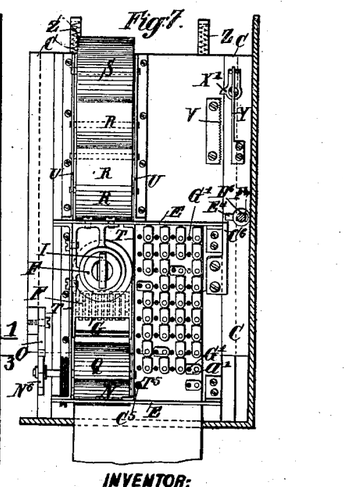
Fig. 7 is a broken plan showing the board above referred to inserted into the apparatus.
Figure 8:
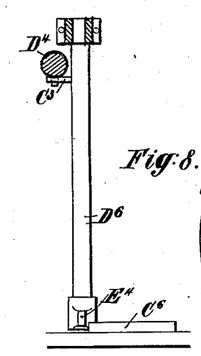
Figs. 8 to 14 are enlarged views of various details.
Figures 20, 21, 22:
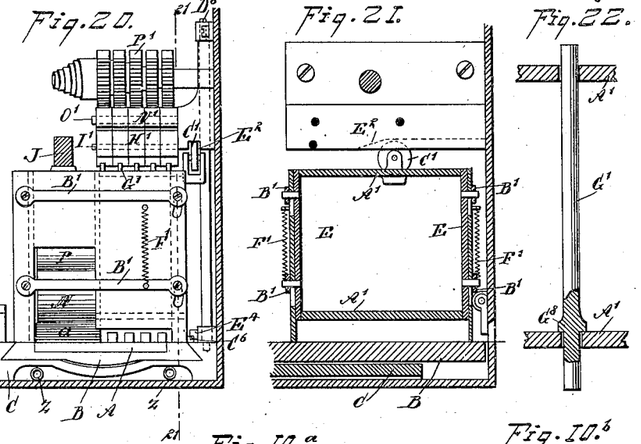
Figs. 20 and 21 are sectional elevations of the apparatus, Fig. 21 being taken upon the line 21 21 of Fig. 20.
Figs. 22 and 23 are sectional details of the rods G'.

The apparatus consists of a slide B, adapted to be actuated by the board A when the latter is introduced through a slot provided in the casing for this purpose. This slide moves in a guideway provided in a stationary base or table C (see Fig. 20) and is drawn toward its normal position by means of springs Z, the forward ends of said springs being stationary, while the rear ends are secured to the rear portion of the slide B, the springs passing under the base C. (See Figs. 6 and 20.) Above the slide B is a compressor F, Figs. 1, 6, and 7, fitted in a guide D of an end plate E, secured to the slide B. This compressor is adapted for contact with the pad $a$, secured, as above described, to the upper part of the board A. A spring H tends to return the compressor to its upper position. The compressor carries at its forward end a numbering and dating stamp G of any approved construction. At the upper end of the rod of the compressor F is a roller I, bearing constantly against an inclined surface on a lever J, mounted to oscillate on an axle K. A spring L, connected to the free end of the said lever, tends to bring it against a stop M. The lever J is so constructed that during the first part of the movement of the slide the compressor will not descend; but during the second part of the slide's movement the compressor will be lowered a distance at least equal to the thickness of the pad $a$ on the board A.

Figures 18, 19:
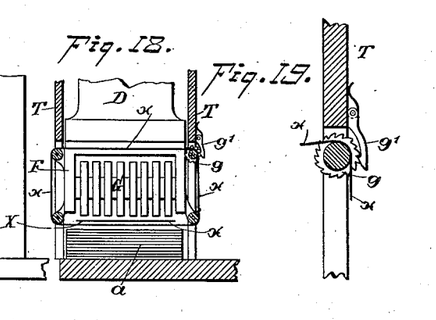

The numbering and dating stamp G is surrounded by an ink-ribbon $x$, which after each impression may be fed forward by means of a ratchet-wheel $g$, carried by one of the rollers over which said ink-ribbon passes, said ratchet-wheel being operated by engagement with a pawl $g'$, secured to one of the stationary sides or guides T, between which the stamp G moves. (See Figs. 18 and 19.) In advance of the numbering and dating stamp is a roller N, whose purpose is to feed forward the requisite distance a paper band X, which I term a "reproduction-band" or "copying-band," since on it are reproduced the items or indications inscribed upon the pad $a$. The roller N is actuated by a ratchet-wheel $N^6$, which by engagement with a pawl O is turned sufficiently to give the proper feed to the paper ribbon X. A roller P, engaging the opposite side of the paper, prevents it from slipping. The paper unwinds from the bobbin S and winds on the bobbin Q. Between them it passes over the moistening-rollers R before passing under the compressor and under the numbering and dating stamp. The bobbin S and the moistening-rollers R are mounted on the sides U U, while the bobbin Q and the rollers N and P are mounted on sides T T, which at the same time form braces for the plates E' E, located at the forward and rear portions of the apparatus, respectively. The winding-bobbin Q is actuated by means of an endless cord $q$ and transmission-pulleys $q'$ $q^2$, secured, respectively, on the axes of the said bobbin and of the roller N.

On the slide B is secured a rack V, adapted to engage a pawl X' under the action of the spring Y, which constantly brings it back to a central position, as hereinafter described.

Figure 23:
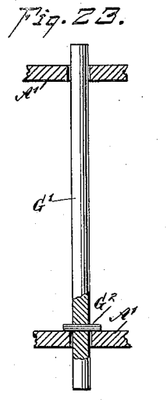

Above the slide B is a frame A', capable of sliding up and down relatively to said slide and guided at its ends by the end plates E E'. In its vertical movement said frame is guided by levers B', fulcrumed on stationary supports. (See Figs. 20 and 21.) The frame further has an antifriction-roller C' engaging a stationary incline E². The frame A' is normally held in its upper position by means of springs F', secured to the levers B' and to the arches E. In this frame are disposed the rods G', mounted to slide and corresponding in number and arrangement to the plates $a'$ of the board A. These rods, when in their normal position, are held at a predetermined height—for instance, at the same height—by means of a pin $G^2$, Fig. 23, which engages the lower cross-bar of the frame A', or by means of an enlargement $G^3$ upon the rod, Fig. 22.

Figure 24:
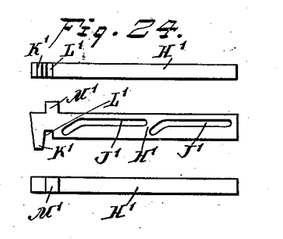
Fig. 24 shows one of the sliding bars H' in bottom view, side elevation, and top view.
Figure 25:
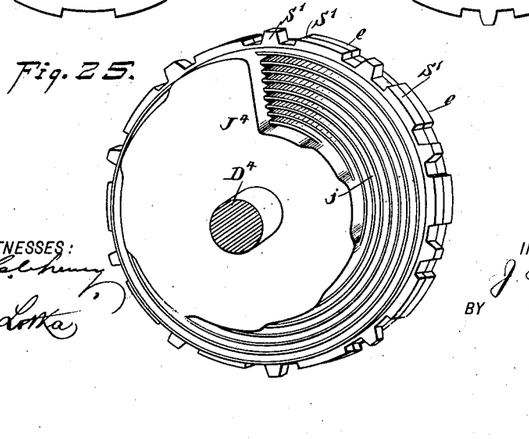
Fig. 25 is a perspective view of one of the step-wheels J$^4$.

Above the frame A' are located parallel bars H', whose number is equal to the number of rows of rods G'—that is, to the number of rows of plates on the board A. Thus in the example shown upon the drawings there are five bars H'. (See Figs. 20 and 24.) These bars are adapted to be carried along by the rods G'. To this end they are mounted on fixed guides I', fitted into grooves J', forming inclined planes, and the bars H' are provided with teeth or projections K', against which the rods G' are adapted to take for the purpose of carrying the said bars along, as described. The bars H' furthermore are provided with notches or seats L' for the reception of the rods G' when the bars H' descend. Teeth M' are also provided on the bars H' for the purpose of engaging and carrying along racks N', mounted to slide horizontally on guides O'. These racks N' engage mutilated pinions P', there being one pinion for each row of rods G' and consequently for each row of plates $a'$. These pinions are connected by hollow shafts $m$ with large toothed wheels Q', each meshing with one of the pinions R' upon a shaft $D^4$. On this shaft $D^4$ are mounted step-wheels $J^4$, rigidly connected to the pinions R', there being nine steps, as shown, and each step is connected to the adjacent step by a gradual transition. The steps of these wheels are prolonged laterally on a portion of the circumference by grooves $j$, Fig. 25, each of equal radius with the corresponding step and extending from the step to the starting-point, so that the groove forming the continuation of the first step is extended over a portion of the circumference equal to one-ninth, the second groove extends over a portion of the circumference equal to two-ninths, and so on. These step-wheels $J^1$ constitute supports upon which rest the rear ends $L^4$ of the rods $K^4$, connected to levers $M^1$ on the axle $m^4$.

The levers $M^1$ are rigid with the toothed sectors $M^5$, engaging toothed wheels $N^4$, rigid with the disks $O^4$. These disks I term "operating-disks," and they are provided at their periphery with figures, while a similar disk $O^5$ bears the indications "Sold," "Exchange," "Avoir.," and other similar terms. The cover or lid of the apparatus is provided with openings $f^4$, registering with said operating-disks.

Each of the operating-disks $O^4$ is connected by a hollow shaft with a corresponding roller $H^4$, on which there are in relief the same figures in the same order. The operating-disk $O^5$ is connected in the same way to a roller $H^5$, having produced thereon the initials of the words on the said controlling-disk, it being understood that these initials are the same as those on one of the rows of the plates $a'$ of the board A. The five impression-rollers $H^4$ $H^5$ are located close together and are adapted to come in contact with a paper band $X^3$, unwinding from a roller W upon a roller $W'$. This band I call the "registering-band." It is advanced by means of a suitable driving-cord applied to the roller or bobbin $W'$—for instance, from a roller $G^4$, having a ratchet-wheel actuated by a pawl $I^4$ on a lever $F^3$, mounted to turn on the shaft $D^4$. Motion is imparted to said lever by means of a projection $t$ on one of the sides U of the slide B. The extremity of the lever which is engaged by the said projection is made in the nature of a pawl, so as to operate in one direction only. Furthermore, the lever $F^3$ is provided with a platen $G^3$, which at the proper moment presses upon the impression-rollers $H^4$ and $H^5$, so as to bring them against the registering-band $X^3$. Ink is provided by means of an ink-roller $r'$.

Figure 2:
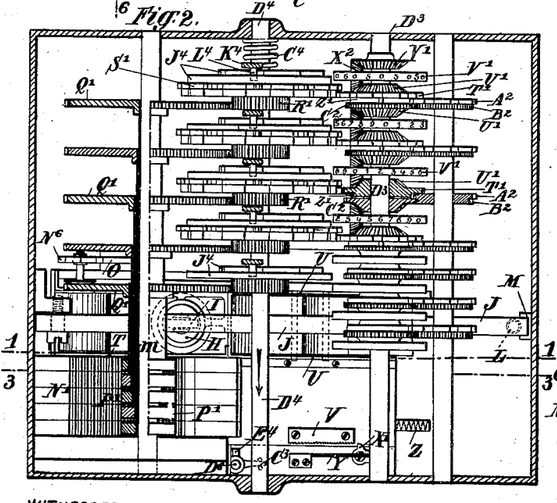
Fig. 2 is a sectional plan of the same on the line 2 2 of Fig. 1.
Figure 3:
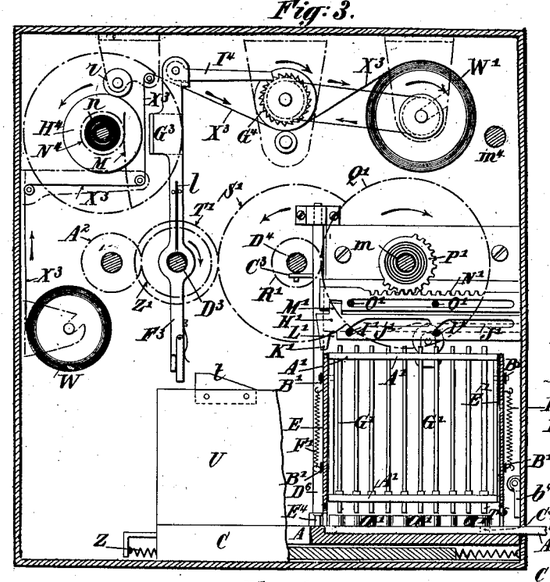
Fig. 3 is a longitudinal section on the line 3 3 of Figs. 2 and 4.
Figure 4:
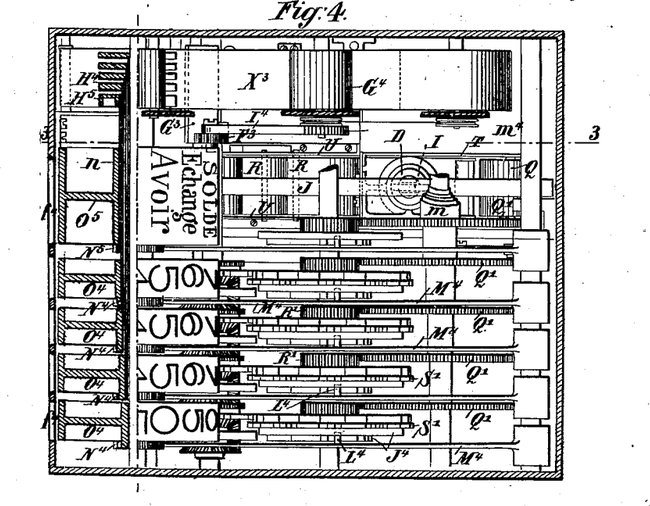
Fig. 4 is a plan with parts omitted.
Figure 5:
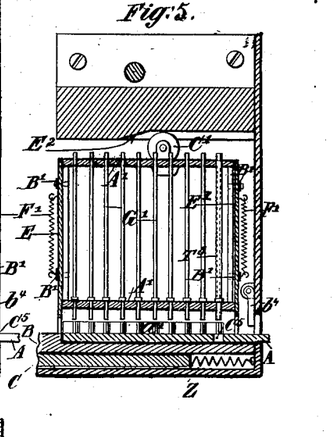
Fig. 5 is a sectional detail of certain parts shown in Fig. 3.

The pinions $R'$ hereinbefore mentioned are likewise rigid with wheels $S'$, having nine teeth adapted to engage the wheels $T'$, having ten teeth and made in the shape of a Maltese cross. This gearing is substantially well known, only ordinarily the wheel engaging that made in the shape of a Maltese cross has only one tooth instead of nine, as in the present case. The circular portions $e$ of the wheels $S'$ are extended laterally, so that when the wheels $S'$ and $T'$ are out of engagement, as shown in Fig. 2, the wheels $T'$ will be held stationary, while the wheels $S'$ will be free to turn. (See Figs. $10^a$, $10^b$, and 25.)

Figure 9:
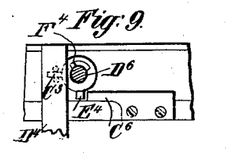

When the apparatus is at rest, the wheels $S'$ and $T'$ are out of engagement, the shaft $D^4$ being under the action of a spring $C^4$. In order to bring the wheels $S'$ and $T'$ into mesh, it is necessary to shift the shaft $D^4$ longitudinally in the direction indicated by the arrow in Fig. 2. To this end I employ the following mechanism: The lever $C^3$ is secured to a vertical shaft $D^6$, actuated by a lever $E^4$, connected to a piece $C^6$ on the slide B. The lever $E^4$ is capable of sliding on the shaft $D^6$ and is capable of moving said shaft, but in one direction only, by the use of a pin $F^4$. This pin projects from the shaft $D^6$ into a longitudinal groove $E^{10}$, provided in the hub of the lever $E^4$. This groove is also segmental, allowing of a limited rotation of the lever $E^4$ independently of the shaft $D^6$ on account of the play the pin $F^4$ is afforded. (See Figs. 9, $9^a$, $9^b$, and $9^c$.)

The wheels $T'$ are rigid with one toothed wheel $Z'$ and with beveled pinions $U'$, engaging, respectively, planet-pinions $X^2$, secured on the side of the disks $V'$, on whose periphery the numbers "0" and "9" are produced twice. The wheels $Z'$ engage wheels $A^2$, forming therewith gearings in the form of a Maltese cross, as hereinbefore mentioned. The planet-pinions $X^2$ engage beveled pinions $Y'$, secured to the wheels $C^2$, engaging toothed wheels $B^2$, so that the pinions $Y'$ turn only when the wheels $Z'$ actuate the wheels $A^2$.

All the wheels $T'$, $U'$, $V'$, $Y'$ $Z'$, and $C^2$ are loosely mounted upon one and the same shaft $D^3$. Only the first of the pinions $Y'$ is entirely rigid. These wheels together form the adding device, serving to add up all the figures inscribed upon the checking-ribbon. It will be understood that there will be a greater number of adding-disks $V'$ than of checking-disks $O^4$.

Figure 9A:
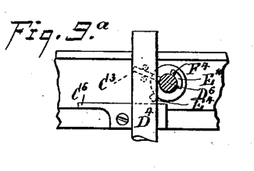
Figure 9B:
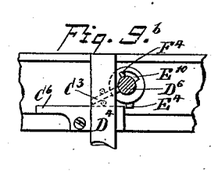
Figure 9C:
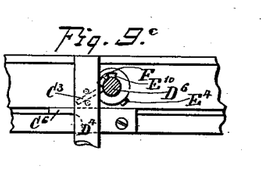
Figure 10:
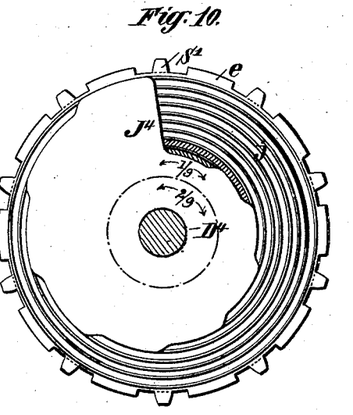
Figure 10A:
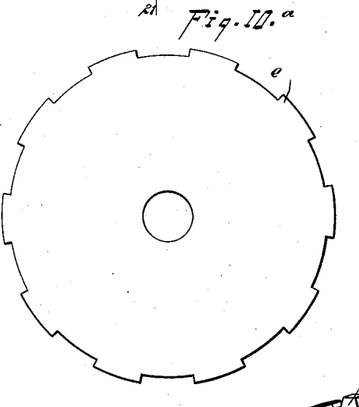
Figure 10B:
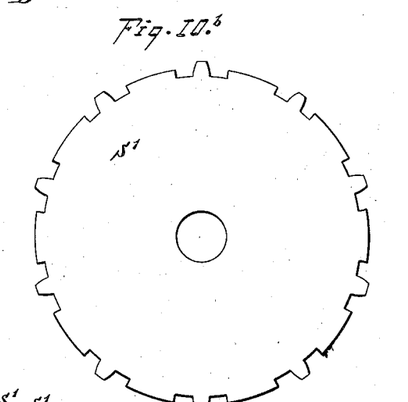
Figure 11:
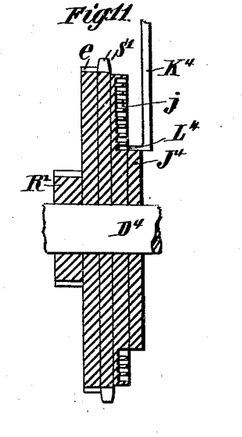
Figure 12:
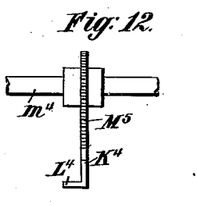
Figure 13:
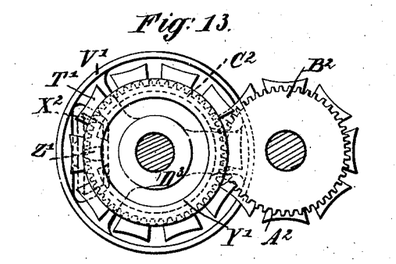
Figure 14:
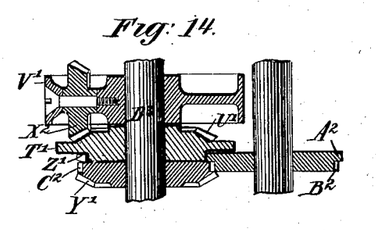

The apparatus above described operates as follows: The bookkeeper inscribes upon the pad $a$ of the board A the items of the transaction to be recorded, this entry being made with copying-pencil or copying-ink. Then the plates $a'$ are turned sidewise, as hereinbefore described, to correspond to the amount written upon the pad; also, if desired, the nature of the transaction may be indicated by turning sidewise one of the plates $a'$ bearing the corresponding indication. The board A, being thus prepared for operation, is inserted through the slot of the casing and pushed forward, in which movement it carries along the slide B, on which it fits. This movement takes place in two steps. During the first period the ratchet-wheel $N^6$ comes in contact with the pawl O and is thereby turned a predetermined distance, causing a portion of the copying-band X, which has been moistened by the roller R, to be fed under the compressor F. At the same time the part $C^6$ on sliding strikes against the lever $E^4$, which, through the medium of the vertical shaft $D^6$ and of the lever $C^3$, (see Fig. $9^a$,) shifts the shaft $D^4$ in the direction indicated by the arrow in Fig. 2, thus coupling the wheels $S'$ and $T'$. When the forward movement is completed, the part $C^3$ allows the lever $E^4$ to assume the position shown in Fig. $9^b$. In the second period of the movement of the slide B the roller I comes in contact with the incline of the lever J and compels the compressor F to lower and press the copying-band X against the pad $a$ of the board A. It will be obvious by this means the apparatus will take a copy on the band X of any matter written or printed on the said pad with copying ink or pencil. At the same time the numbering and dating stamp G, resting on its inking-ribbon $x$, which is placed between the moist copying-band X and the pad $a$, will produce simultaneously upon the upper leaf of the pad $a$ and upon the copying-band X the serial number and the date. Since the incline of the lever J is adjusted to cause the compressor F to travel a distance equal to the entire thickness of the pad $a$, it will be obvious that when the pad is still complete the compressor cannot descend this entire distance. In this case the roller I acts on the lever J and compels it to rise again, while the opposing spring L always holds the compressor down upon the pad with a practically uniform force. It will be obvious that the band will take a copy not only of the first leaf of the pad, but successively of any leaves upon which any matter may be written or printed. During the first period of the forward movement of the slide B the frame A' moves along freely, causing the roller C' to engage the incline E² and produce a downward movement of the said frame. All the rods G' move downward, together with the frame A', with the exception of those which collide with those plates a' of the board A which have turned sidewise, as indicated upon the drawings. The rods so engaged will project at the upper end of the frame A'. During the second period of the forward movement of the slide B the projecting rods G' collide with the teeth K', and thereby cause the bars H' to slide on the guides I', moving downward, owing to the inclined arrangement of the grooves J', while the notches L' hold the said rods G'. It will be obvious that the nearer the projecting rod G' is to the projection K' the farther the bar H' will be moved forward. Thus the rod G', corresponding to the plate a' marked "9," will move the bar H' a greater distance than the rod G', corresponding to the plate a' marked "1." The bars H' in their forward movement carry along the racks N' by means of projections M'. These racks, whose movement thus is of varying extent, impart a corresponding movement to the pinions P', connected to the wheels Q' by means of hollow shafts m. The wheels Q' actuate the pinions R', and thus the step-wheel J⁴, which is rigid therewith, thus raising the rods K a number of steps corresponding to the rotation of the wheels. This rise is communicated to the levers M⁴, having toothed sectors N⁵, and thus are operated the wheels N⁴ and N⁵, secured to the controlling-disks O⁴ O⁵. The controlling-disks being connected to the impression-rollers H⁴ and H⁵ by means of hollow shafts M cause the said rollers to turn. By this means the controlling-disks and the impression-rollers are brought into such a position that the figures or indications thereon correspond exactly to the matter written or printed upon the pad a and indicated by the plates a' turned sidewise. When the projection t of the disk O⁵ engages the lever F, whose platen G³ presses the adding-band X³ upon the impression-rollers H⁴, the figures and indications on the disks O⁴ and O⁵ are visible through the openings f⁴, so that the operator may check the correctness of the operation while the registering-band X³ receives the impressions. This impression takes place at the time the slide B reaches the end of its forward movement. At this moment the projection t of the slide B, which so far has been in contact with the end of the lever F³ for the purpose of feeding the registering-band X³ forward, is released from said lever F³, which under the action of a spring secured to the shaft B³ returns toward its original position and by means of its platen G³ presses the registering-band X³ against the impression-rollers H⁴ and H⁵. The pinions R' actuate not only the step-wheels J⁴, whose function has been described above, but further act upon the wheels S', which are connected to the adding device proper. These wheels S' engage the wheels T', rigid with the pinions N', which carry along the planet-pinions X², whereby the adding-disk V' is caused to travel half the way that the wheel has traveled, since said pinion engages also the normally stationary wheel Y'. Thus when the pinion N' makes a complete revolution the adding-disk V' will only make half a revolution, and this is the reason why the adding-disks are provided with two series of numbers from "0" to "9." When the wheel T' has completed one turn, it acts to carry one unit to the adding-wheel of the next higher denomination. This carrying is effected by means of a one-toothed wheel Z' engaging the wheel A², coupled to the toothed wheel B², which engages the wheel C², rigid with the wheel Y'. Thus it will be seen that the wheel Y' can turn only when the wheel A² is actuated by the wheel Z'. This carrying is of course also applied for higher denominations than those provided for on the board A. It will thus be understood that each time one of the adding-disks Y' completes a half-revolution (passing from "9" to "0") the one-toothed wheel or carrying-wheel Z', which is arranged to actuate the adding-disk V' of the next higher denomination, will, through the medium of the wheels A², B², Y', and X², turn the said adding-disk of the next higher denomination so as to add one unit. Of course it may occur that two adding-disks T' will be caused to move simultaneously, as when passing from "99" to "100." In this case when the units-wheel passes from "9" to "0" the tens-wheel will also pass from "9" to "0" and the hundreds-wheel will pass from "0" to "1"— that is, two of the carrying-wheels Z' will operate simultaneously. It will be understood that the adding-disks are always turned the required quantity, and thus the various amounts or items registered are added up consecutively, so that the total sum of the transactions may be readily ascertained at the end of the day. The controlling-disks and the impression-rollers return to their original position after each introduction of the board A. When the slide B arrives at the end of its forward movement, the lever E⁴ is released and causes the lever C³ to move, releasing the shaft E⁴ and permitting the longitudinal movement of the said shaft in the opposite direction to that indicated by the arrow in Fig. 2. Such shifting of the shaft will bring the wheels S' into engagement with the wheels T'. During the return movement of the slide B the wheels S', pinions R', and the wheels Q' can return to their original position without affecting the adding-wheels, since the wheels D' are engaged with the circular portions e, forming lateral continuations of the wheels S'.

During the longitudinal movement of the shaft D⁴ the rear ends L⁴ of the rods K⁴ take into the circular grooves, which form lateral continuations of the steps of the wheels J⁴. The operation is then practically completed— that is, all the indications inscribed upon the upper leaf of the pad a have been transferred to the copying-ribbon X simultaneously with the serial number and the date, which have likewise been stamped upon the said leaf. Also the amount of the items entered upon the pad has been registered on the band X³, as described, and is visible through the opening $f^4$. At the same time said amount is added in the adding device to any amount which may have been registered previously. The board A may then be withdrawn from the apparatus. The slide B is then returned to its original position by the springs Z. During this movement the frame A', carrying the rods G', likewise moves back and carries along the bars II', which in turn restore the racks N' to their original position. Owing to the provision of the inclined grooves hereinbefore mentioned the bars II' are released from the frame A', when they return to their original position. Also by reason of the inclined plane hereinbefore mentioned the frame A' can be raised by the springs which connect the arms B' to the sides E of the slide, so that the rods G' are disengaged from the plates a'. During the return movement of the slide the racks M' also turn the pinions P', causing them and the wheels S' to resume their original positions without affecting the position of the adding-wheels V', which remain stationary, owing to the fact that the wheels S' and T' have been thrown out of mesh, as hereinbefore mentioned.

It will be remarked that during the return movement of the slide the part C⁶ turns the lever E⁴ in the opposite direction; but the projection F⁴ on shaft D⁶ does no more engage the lever, (see Fig. 9ª,) and since the slide has returned to its first position the lever is released by the part C⁶ and returns to its first position. (See Fig. 9.)

In order that the operation may be executed with certainty, it is necessary that the slide B be pushed forward to the end of its forward travel. To prevent any mistakes in this direction, I provide the following arrangement: When the slide B is moved forward, the rack V engages the pawl X'. When the slide arrives at the end of its travel, the pawl X' does no more engage the teeth of the rack, (which is of proper length to secure this result,) and thus the pawl returns to its original position. When the slide moves back, the rack V pushes the pawl X' in the opposite direction, so that the said pawl glides over the teeth. When the carriage has returned to its original position, the pawl again engages the smooth portion of the rack-bar and is restored to its normal position by the spring Y. Furthermore, I provide a device for preventing the withdrawal of the board from the operation after its insertion therein unless the whole operation has been effected properly. For this purpose when the frame A' descends a rigid rod T⁵, secured to the said frame, engages the depression C⁵ in the board. It follows that if the slide has not been pushed in entirely it cannot return and the board cannot be withdrawn. If the slide is pushed in thoroughly and yet for some reason does not return to its original position, the frame A' fails to return to its upper position and the board A remains in the apparatus, thus indicating that something is wrong.

In order to guard against errors arising from failures to shift the pivoted plates a' back to their original position, I provide the following automatic arrangement: Levers b⁴ are freely suspended at the orifice through which the board A is introduced. These levers are so arranged as to register with the space between the rows of plates a'. When the board A is pushed inward, these levers give way, being free to swing without affecting the position of the plates. The levers, however, swing in one direction only, and thus when the board A is withdrawn said levers, by engaging those plates a' which have been turned sidewise, will turn said plates back to their original position. Finally, the controlling-disks O⁴ and O⁵ and the impression-rollers H⁴ and H⁵ are returned to their original position at the time the second and third board, and so on, are introduced into the apparatus, since when the wheels S' and T' are thrown into engagement the rear ends L⁴ of the rods K⁴, which previously were engaged in the circumferential grooves of the step-wheels J⁴, are released from said grooves and thrown upon the step which is next to the center. This causes the levers M⁴ to swing downward and to bring the controlling-disks O⁴ and O⁵ and the impression-rollers H⁴ and H⁵ back to their original position.

Having thus described my invention, I claim as new and desire to secure by Letters Patent—

1. The combination of a slide or carriage, a board or holder having movable projections or plates for operating the carriage, and a registering apparatus operated by those plates which have been moved out of their normal position, substantially as described.

2. The combination of the slide or carriage, the board for operating the carriage and having a series of movable plates, a controlling device, a registering device, and an adding device operated by those plates which have been moved out of their normal position, substantially as described.

3. The combination of the board having pivoted plates, the slide or carriage constructed to receive said board, a movable frame and rods carried by said frame and arranged to project into the path of the said plates when the latter are moved out of their normal position, substantially as described.

4. The combination of the operating-board having projections, the carriage constructed to receive said board, the movable frame, the rods carried by said frame, the incline arranged to effect a downward movement of the frame when the carriage is moved inward, bars provided with inclined guideways and carried along by the said rods when the latter are operated by engagement with the projections on the operating-board, substantially as described.

5. The combination of the carriage, the movable frame, the rods carried thereby, the bars engaged by the rods, the racks connected to said bars, pinions engaging said racks, a controlling device and an adding device operatively connected to said pinions, substantially as described.

6. The combination of the carriage, the longitudinally-movable shaft shifted by the forward movement of the carriage, wheels loosely mounted on said shaft, a parallel shaft carrying wheels in the form of a Maltese cross, the wheels on said parallel shaft being moved into or out of engagement by the longitudinal movement of the first-named shaft, and an adding device connected to the wheels on the second-named shaft, substantially as described.

7. The combination of the carriage, the frame operated thereby, the rods carried by said frame, the board having projections for engaging said rods, mechanism operated by the rods, and a stop secured to the said frame and adapted to engage the said board for the purpose of preventing its withdrawal until after the completion of the operation, substantially as described.

8. The combination of the carriage and apparatus operated thereby with an operating-board having movable projections, and yielding stops or levers secured to the frame of the apparatus and adapted to engage said projections the stops yielding in one direction only and being adapted to shift the projections back to their original position upon the withdrawal of the board, substantially as described.

9. The combination of the carriage, the board carrying a pad and movable projections or plates, a copying-band adapted to be fed over the pad, a compressor adapted to press said band upon the pad, and a numbering and dating stamp adapted for engagement with the said band and with the pad, substantially as described.

10. The combination of the carriage and the adding device operated thereby, said device comprising wheels consisting of disks divided into segments of different diameters and forming steps, each step being prolonged laterally by a portion of equal diameter and levers engaged by said wheels and adapted to move the numbered disks, substantially as described.

11. The combination of the carriage and the adding device operated thereby, said adding device comprising step-wheels, levers operated by said wheels, controlling-disks actuated by the levers, impression-rollers rigid with said controlling-disks, and a registering-band upon which said rollers are adapted to print, substantially as described.

12. The combination of the carriage and the adding device operated thereby, said adding device having impression-rollers, a registering-band on which said rollers are adapted to print, and a lever receiving its movement from the carriage and operatively connected to the said band to feed it forward and to the impression-rollers to bring them against said band, substantially as described.

13. A recording apparatus comprising copying, recording, checking and indicating mechanism, and an actuating-board constructed to be inserted from the exterior of the apparatus, substantially as described.

14. A recording apparatus comprising copying, recording, checking, indicating and adding devices, and an actuating-board for operating the apparatus, said board having a plurality of plates or projections pivoted thereon and capable of actuating the mechanism, substantially as described.

15. The combination with a casing, of a movable rod-carrier, a plurality of rods slidable in the rod-carrier, and recording mechanism actuated by the rod, substantially as described.

16. The combination with a casing, of a carriage slidable thereon, a plurality of rods slidably mounted on the carriage, a rack-bar capable of being operated by the rods, and recording mechanism operated from the rack-bar, substantially as described.

17. The combination with a casing, of a carriage slidable thereon, a plurality of rods mounted to move independently on the carriage, a sliding rack-bar, and operating devices connected to the rack-bar and having a detent capable of being engaged by the rods, and recording mechanism operated from the rack-bar, substantially as described.

18. The combination with a casing, of a carriage slidably mounted on the casing, a plurality of rods mounted to move independently on the carriage, a rack-bar slidably mounted on the casing, an operating device in connection with the rack-bar and having a detent adapted to be engaged by the rods, the operating device moving in diagonal guides, and recording mechanism operated from the rack-bar, substantially as described.

19. The combination with a casing, of a carriage slidably mounted on the casing, a series of independently-movable rods carried by the carriage, a rack-bar slidably mounted on the casing, mechanism driven from the rack-bar, and an operating device slidable with the rack-bar and movable transversely independently of the rack-bar, the operating device having transversely-slidable connection with the rack-bar and being capable of being operated by engagement with the rods, substantially as described.

20. The combination of a slidable rack-bar, an operating device slidable with the rack-bar and moving transversely independently of the rack-bar, the operating device having transversely-slidable connection with the rack-bar, and means for sliding the said operating device, substantially as described.

21. The combination of a slidable rack-bar, an operating device having a diagonal slot therein and having transversely-slidable connection with the rack-bar, a stationary member coacting with the slot of the operating device to move the operating device transversely independently of the rack-bar, and means for moving the operating device, substantially as described.

22. A recording apparatus operated by an actuating-board with movable projections, the recording apparatus having means for returning the projections for operating said apparatus to a normal position upon the withdrawal of the board from the apparatus, substantially as described.

23. The combination with a recording apparatus, of a carriage movable therein and carrying operative parts, a spring tending to normally draw the carriage to an inactive position, and means for holding the carriage in an active position during the operation thereof, substantially as described.

24. The combination with a casing, of a carriage slidable therein and having the parts movable thereon, a pivoted cam member adapted to have the movable parts of the carriage engaged therewith, and a spring holding the cam member in a normal position and permitting a yielding of the cam member, substantially as described.

25. The combination of a lever, a sector carried thereon, gearing engaged with and driven by the sector, and a disk provided with a series of cammed surfaces serving to operate the lever, substantially as described.

26. The combination of a lever, a sector at the end of the lever, gearing engaged with and driven by the sector, and a cam the periphery of which is formed with a series of graduated cams such cams being capable of operating the lever to various extents, substantially as described.

In testimony whereof I have signed my name to this specification in the presence of two subscribing witnesses.

JULES FRYDMANE.

Witnesses:
LÉON FRANCKEN,
EDWARD P. MACLEAN.